United States Patent
Song et al.

(10) Patent No.: US 10,067,380 B2
(45) Date of Patent: Sep. 4, 2018

(54) CURVED DISPLAY WITH INDIVIDUAL REFLECTORS UNDER THE LEDS

(71) Applicant: Samsung Display Co., Ltd., Yongin-si, Gyeonggi-Do (KR)

(72) Inventors: Juhee Song, Anyang-si (KR); Young-Min Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 479 days.

(21) Appl. No.: 14/800,367

(22) Filed: Jul. 15, 2015

(65) Prior Publication Data

US 2016/0061414 A1    Mar. 3, 2016

(30) Foreign Application Priority Data

Sep. 1, 2014 (KR) .................... 10-2014-0115392

(51) Int. Cl.
*G02F 1/00* (2006.01)
*G02F 1/1335* (2006.01)

(52) U.S. Cl.
CPC .. *G02F 1/133603* (2013.01); *G02F 1/133605* (2013.01); *G02F 1/133611* (2013.01)

(58) Field of Classification Search
CPC ................ F21V 7/0066; F21V 7/0083; G02F 1/133602–1/133611; F21Y 2105/10–2105/18
USPC .................. 362/97.1–97.4; 349/67
See application file for complete search history.

(56) References Cited

U.S. PATENT DOCUMENTS

| 7,826,006 B2* | 11/2010 | Koganezawa .... G02F 1/133611 349/56 |
|---|---|---|
| 8,911,133 B2 | 12/2014 | Sato et al. |
| 2013/0088857 A1 | 4/2013 | Lee et al. |
| 2014/0009914 A1* | 1/2014 | Cho .......................... G09F 9/35 362/97.3 |
| 2015/0029698 A1* | 1/2015 | Huang .............. G02F 1/133603 362/97.1 |
| 2015/0378188 A1* | 12/2015 | Moon .................... G02F 1/1333 349/65 |
| 2016/0252231 A1* | 9/2016 | Fujikawa .............. F21V 19/005 362/235 |

FOREIGN PATENT DOCUMENTS

| KR | 20-0361393 Y | 8/2004 |
|---|---|---|
| KR | 10-1269591 B1 | 1/2008 |

(Continued)

*Primary Examiner* — Sean Gramling
*Assistant Examiner* — Gerald J Sufleta, III
(74) *Attorney, Agent, or Firm* — H.C. Park & Associates, PLC

(57) ABSTRACT

A display apparatus includes a display panel curved along a first direction and a backlight unit. The backlight unit includes a bottom chassis, light emitting diodes, reflecting members, and a reflecting sheet. The light emitting diodes include a first light emitting diode and a second light emitting diode. The second light emitting diode is spaced apart from the first light emitting diode in the first direction. A first area that a first reflecting member disposed under the first light emitting diode among the reflecting members is exposed is different from a second area that a second reflecting member disposed under the second light emitting diode among the reflecting members is exposed.

15 Claims, 8 Drawing Sheets

(56) References Cited

FOREIGN PATENT DOCUMENTS

| KR | 10-2013-0061796 A | 6/2013 |
| KR | 10-2013-0082084 A | 7/2013 |
| KR | 10-2014-0007202 A | 1/2014 |
| KR | 10-2014-0011080 A | 1/2014 |

* cited by examiner

CURVED DISPLAY WITH INDIVIDUAL REFLECTORS UNDER THE LEDS

CLAIMS OF PRIORITY

This U.S. non-provisional patent application claims the priority of and all the benefits accruing under 35 U.S.C. § 119 of Korean Patent Application No. 10-2014-0115392, filed on Sep. 1, 2014, the entire contents of which are hereby incorporated by reference.

BACKGROUND OF THE INVENTION

The present invention disclosed herein relates to a backlight unit and a display apparatus having the same, and more particularly, to a backlight unit providing uniform luminescence and a display apparatus having the same.

Non-self-emissive display apparatuses such as a liquid crystal display (LCD) apparatus, an electrophorectic display apparatus, and an electrowetting display apparatus need separate backlight units for radiating light. The backlight units are classified into an edge type and a direct type depending on the location of a light emitting diode (LED) on a display surface on which an image is displayed. Since the direct type backlight unit has no need for a light guide plate and a heat emitting part needed for the edge type back light unit, there is an advantage in that a manufacturing cost is lower when compared to the edge type backlight unit. Also, the direct type backlight unit may obtain higher luminescence with the same power because light loss is less when compared to the edge type backlight unit.

The display apparatus is manufactured to be flat but a curved display apparatus is being recently developed. The curved display apparatus may provide a curved display region and may thus provide a user with an image enhancing absorption and presence.

SUMMARY OF THE INVENTION

The present invention provides a display apparatus enhancing a display quality and the present invention also provides a backlight unit that provides uniform luminescence.

Embodiments of the present invention provide a display apparatus including a display panel and a backlight unit. The display panel is curved along a first direction and the backlight unit provides the display panel with light.

The backlight unit includes a bottom chassis, light emitting diodes, reflecting members, and a reflecting sheet. The bottom chassis includes a bottom portion curved along the first direction. The light emitting diodes are disposed on the bottom portion. The reflecting members are disposed on the bottom portion and under the light emitting diodes having a one-to-one correspondence. The reflecting sheet covers the bottom portion and the reflecting members, reflects light generated from the light emitting diodes, and exposes a portion of each of the reflecting members. The light emitting diodes include a first light emitting diode and a second light emitting diode. The second light emitting diode is spaced apart from the first light emitting diode in the first direction. A first area that a first reflecting member disposed under the first light emitting diode among the reflecting members is exposed and is different from a second area that a second reflecting member disposed under the second light emitting diode among the reflecting members is exposed.

In other embodiments of the present invention, a backlight unit includes a bottom chassis, light emitting diodes, reflecting members, and a reflecting sheet. The bottom chassis includes a bottom portion curved along the first direction. The light emitting diodes are disposed on the bottom portion. The reflecting members are disposed on the bottom portion and under the light emitting diodes having a one-to-one correspondence. The reflecting sheet covers the bottom portion and the reflecting members, reflects light generated from the light emitting diodes, and exposes a portion of each of the reflecting members. The light emitting diodes include a first light emitting diode and a second light emitting diode. The second light emitting diode is spaced apart from the first light emitting diode in the first direction. A first area that a first reflecting member disposed under the first light emitting diode among the reflecting members is exposed is different from a second area that a second reflecting member disposed under the second light emitting diode among the reflecting members is exposed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
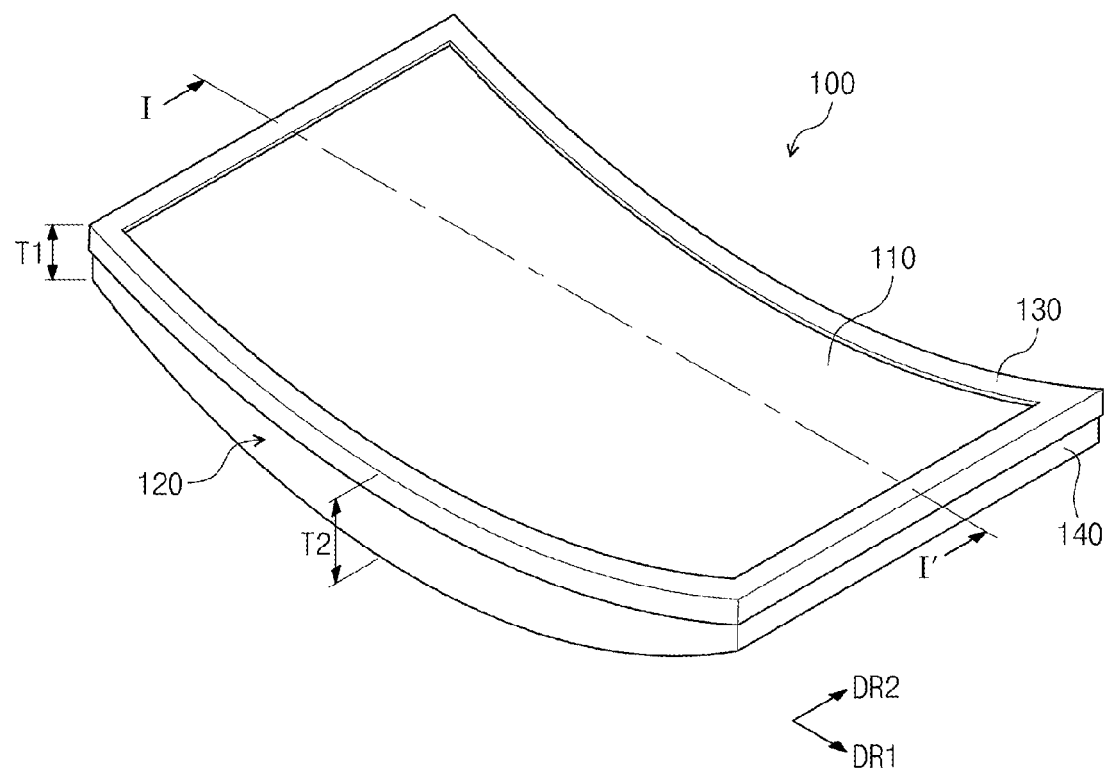
FIG. 1 is a perspective view of a display apparatus according to an embodiment of the present invention.

Embodiments of the present invention are described below in detail with reference to the accompanying drawings. The above objectives, characteristics and effects of the present invention will be easily understood through the accompanying drawings and related embodiments. However, the present invention is not limited to embodiments to be described below but may be implemented through various applications and variations. Rather, the embodiments of the present invention to be described below are provided to make the technical spirit disclosed herein clearer and fully convey the technical spirit of the present invention to a person skilled in the art. Thus, the scope of the present invention should not be construed as being limited by embodiments to be described below. The same reference numerals denoted in the following embodiments and the accompanying drawings represent the same components.

Also, the terms a "first", a "second", etc. used herein are not used as limited meanings but used for the purpose of distinguishing one component from another. When a portion of a layer, a region, or a component is referred to as being "on" another portion, it can be directly on the other portion or intervening layers, regions, or components may also be present.

Figure 2:
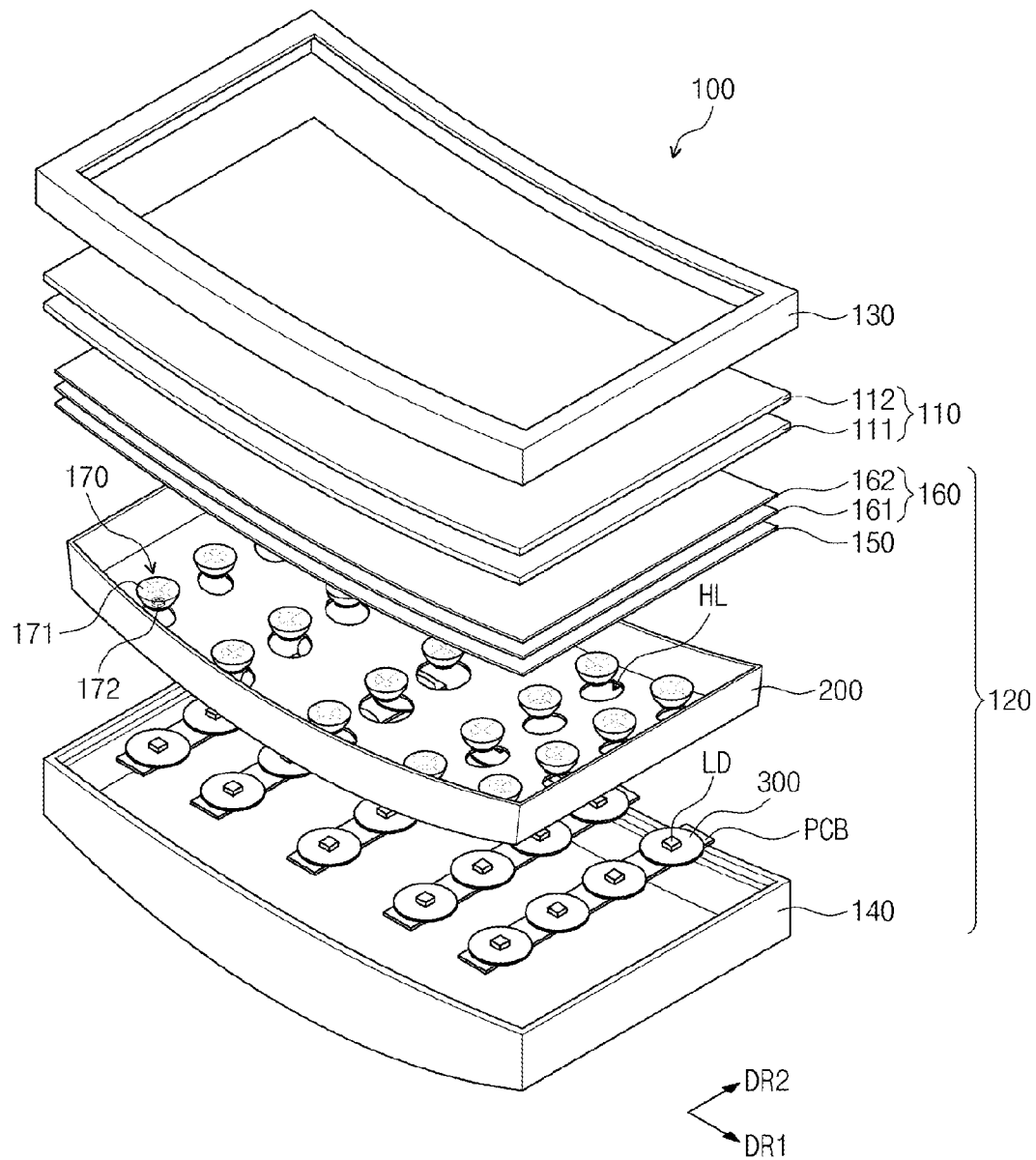
FIG. 2 is an exploded, perspective view of the display apparatus of FIG. 1.
Figure 3:
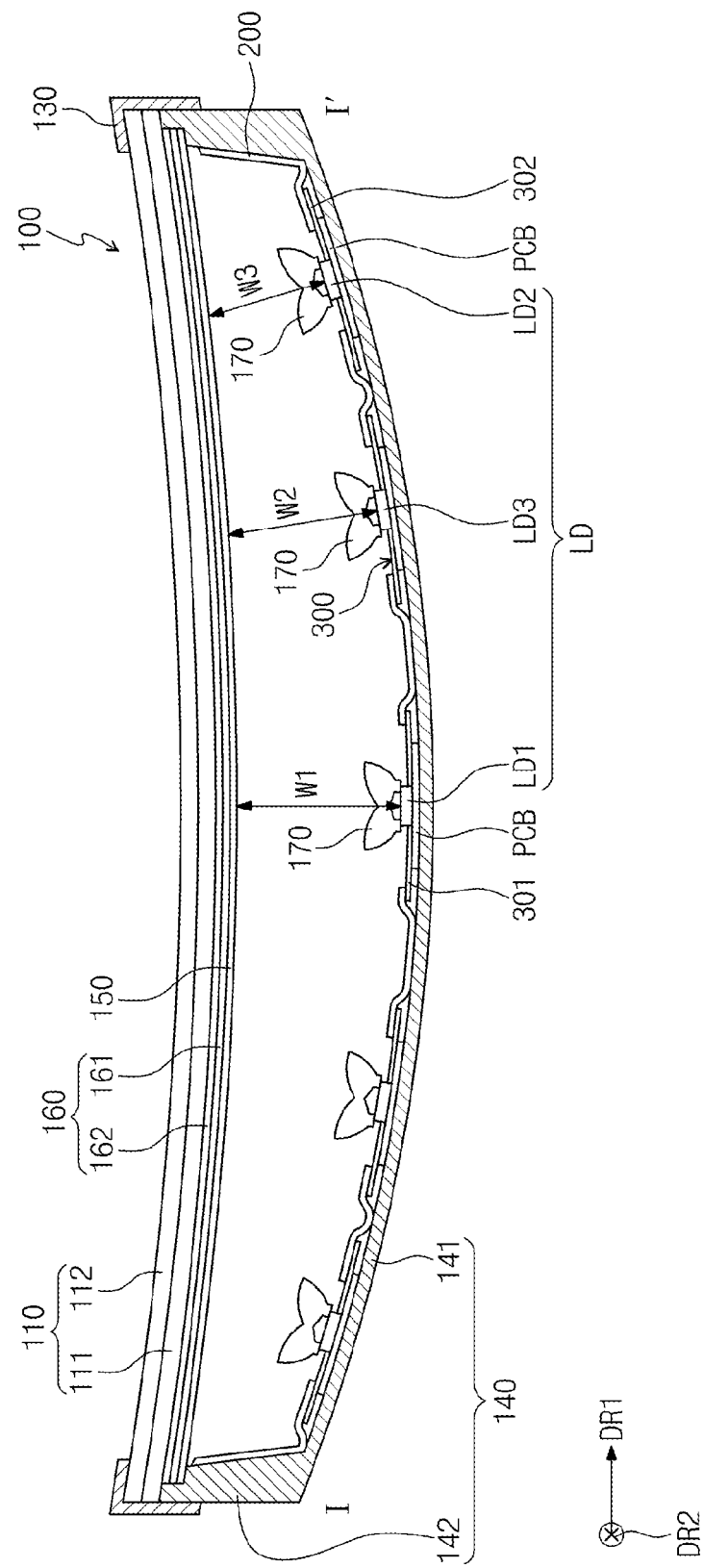
FIG. 3 is a cross-sectional view taken along line I-I' in FIG. 1.

FIG. 1 is a perspective view of a display apparatus according to an embodiment of the present invention, FIG. 2 is an exploded, perspective view of the display apparatus of FIG. 1, and FIG. 3 is a cross-sectional view taken along line I-I' in FIG. 1.

Referring to FIGS. 1 to 3, a display apparatus 100 includes a display panel 110, a backlight unit 120, and a top chassis 130. For the convenience of description, a surface of the display apparatus 100 on which an image is provided is defined as an upper surface and the opposite surface of the upper surface is defined as a lower surface.

The display panel 110 displays an image. The display panel 110 may be any one of a liquid crystal display (LCD) panel, an electrowetting display panel, and an electrophoretic display panel, and a micro electro mechanical system (MEMS) display panel. In the present embodiment, the LCD panel is described as an example.

The display panel 110 may be a quadrilateral plate having two pairs of sides. In the present embodiment, the display panel 110 may be a rectangular shape having a pair of long sides and a pair of short sides. The display panel 110 includes a display substrate 111, an opposite substrate 112 facing the display substrate 1111, and a liquid crystal layer (not shown) between the display substrate 111 and the opposite substrate 112. The display panel 110 may include a display region on which an image is displayed and a non-display region surrounding the display region and not displaying the image, when viewed from the top.

In the present embodiment, the display panel 110 may be curved along a first direction DR1. Thus, the display panel 110 may use a concavely curved display region to display an image enhancing absorption and presence.

The backlight unit 120 provides the display panel 110 with light and the backlight unit 120 is disposed under the display panel 110. The backlight unit 120 may include a bottom chassis 140, a diffusion member 150, optical sheets 160, light emitting diodes LD, reflecting members 300 and a reflecting sheet 200.

The light emitting diodes LD may generate light. The reflecting members 300 may have a one-to-one correspondence with a plurality of light emitting diodes LD and may be disposed under the light emitting diodes LD. The reflecting sheet 200 may cover the bottom chassis 140 and the reflecting members 300, reflect light generated from the light emitting diodes LD and may expose a portion of each of the reflecting members 300.

The bottom chassis 140 includes a bottom portion 141 and sidewalls 142 extended from the bottom portion 141. The sidewalls 142 may be extended upwardly from the bottom portion 141 and the sidewalls 142 may be at an angle to the extended surface of the bottom portion 141. The bottom portion 141 may have a shape curved along the first direction DR1.

The diffusion member 150 may be disposed on the light emitting diodes LD. The diffusion member 150 and the bottom portion 141 have a shape curved along the first direction DR1 with different radius of curvature. In the present embodiment, the radius of curvature of the diffusion member 150 may be larger than the radius of curvature of the bottom portion 141. Thus, when the distance between any one of the light emitting diodes LD and the diffusion member 150 is defined as an optical distance, the optical distance may vary depending on the location of the light emitting diodes LD.

For example, the light emitting diodes LD may include a first light emitting diode LD1 and a second light emitting diode LD2, and the second light emitting diode LD2 may be spaced apart from the first light emitting diode LD1 in the first direction DR1.

In the present embodiment, the first light emitting diode LD1 may be disposed at the center of the bottom portion 141 and the second light emitting diode LD2 may be disposed on the edge of the bottom portion 141. The edge of the bottom portion 141 may be spaced apart from the center of the bottom portion 141 in the first direction DR1.

The light emitting diodes LD may be include a third light emitting diode LD3. The third light emitting diode LD3 may be spaced apart from the first light emitting diode LD1 in the first direction DR1. The third light emitting diode LD3 disposed between the first light emitting diode LD1 and the second light emitting diode LD2. The optical distance between the first light emitting diode LD1 and the diffusion member 150 is defined as a first optical distance W1, the optical distance between the third light emitting diode LD3 and the diffusion member 150 is defined as a second optical distance W2, and the distance between the second light emitting diode LD2 and the diffusion member 150 is defined as a third optical distance W3.

In the present embodiment, the first optical distance W1 may be larger than the second optical distance W2, and the second optical distance W2 may be larger than the third optical distance W3. That is, the optical distance may become small as it recedes from the center of the bottom portion 141 in the first direction DR1. However, the optical distances defined for the light emitting diodes LD arranged in a second direction DR2 among the light emitting diodes LD may be mutually the same.

The thickness of the display apparatus 100 curved along the first direction DR1 recognized by a user is the thickness T1 of the external portion of the side of the display apparatus 100. In the present embodiment, since the third optical distance W3 of the edge portion of the bottom portion 141 is smaller than the first optical distance W1, the thickness of the external portion of the side of the display apparatus 100 may be smaller than the thickness T2 of the center of the display apparatus 100. Thus, the thickness of the display apparatus 100 recognized by a user may be thin and the first optical distance W1 of the first light emitting diode LD1 disposed at the center of the bottom portion 141 may be larger than the third optical distance W3. Since the first optical distance W1 is larger than the third optical distance W3, light generated from the first light emitting diode LD1 disposed at the center of the bottom portion 141 may spread more widely than light generated from the second light emitting diode LD2. As a result, it is possible to decrease luminescence speck from the diffusion member 150 corresponding to the center of the bottom portion 141.

The optical sheets 160 may be disposed between the diffusion member 150 and the display panel 110. The optical sheets 160 may play a role in controlling the path of light emitted from the light emitting diodes LD. The optical sheets 160 may include a prism sheet 161 and a protective sheet 162. When light spreads by the spreading member 150, the prism sheet 161 collects light so that the travel direction of spread light is similar to the normal direction of the display apparatus 110. The protective sheet 162 protects the prism sheet 161 from an external shock. Although the present embodiment describes that each of the optical sheets 160 include the prism sheet 161 and the protective sheet 162, the present invention is not limited thereto. For example, the optical sheets 160 may be formed by overlaying at least one of the prism sheet 161 and the protective sheet 162 in another embodiment of the present invention, and one or more sheets may not be provided as needed.

The top chassis 130 may be disposed on the display panel 110 to cover a non-display region of the display panel 110. The top chassis 130 may combine with the bottom chassis 140 to support the edge portion of the display panel 110 and a display window that exposes the display region of the display panel 110 may be defined on the top chassis 130.

The plurality of light emitting diodes LD may be arranged side by side in the first direction DR1 and in the second direction DR2 on the bottom portion 141. A printed circuit board (PCB) may be disposed between the light emitting diodes LD and the bottom portion 141 and the light emitting diodes LD may be mounted on the PCB to receive a driving voltage from the PCB.

The reflecting members 300 have a one-to-one correspondence with the light emitting diodes LD and may be disposed on the bottom portion 141. In the present embodiment, the reflecting members 300 may be disposed between the PCB and the light emitting diodes LD and may have a one-to-one correspondence with the light emitting diodes LD. The reflecting members 300 may be disposed under the light emitting diodes LD to prevent light generated from the light emitting diodes LD from becoming leaked to the PCB. A hole (not shown) through which the light emitting diodes LD pass may be defined in each of the reflecting members 300. The size of the hole (not shown) may correspond to that of each of the light emitting diodes LD.

Through holes HL which have a one-to-one correspondence with the light emitting diodes LD and through which the light emitting diodes LD pass may be defined in the reflecting sheet 200. In the present embodiment, a portion of each of the reflecting members 300 disposed under the reflecting sheet 200 may be exposed by the through holes HL.

Figure 5A:
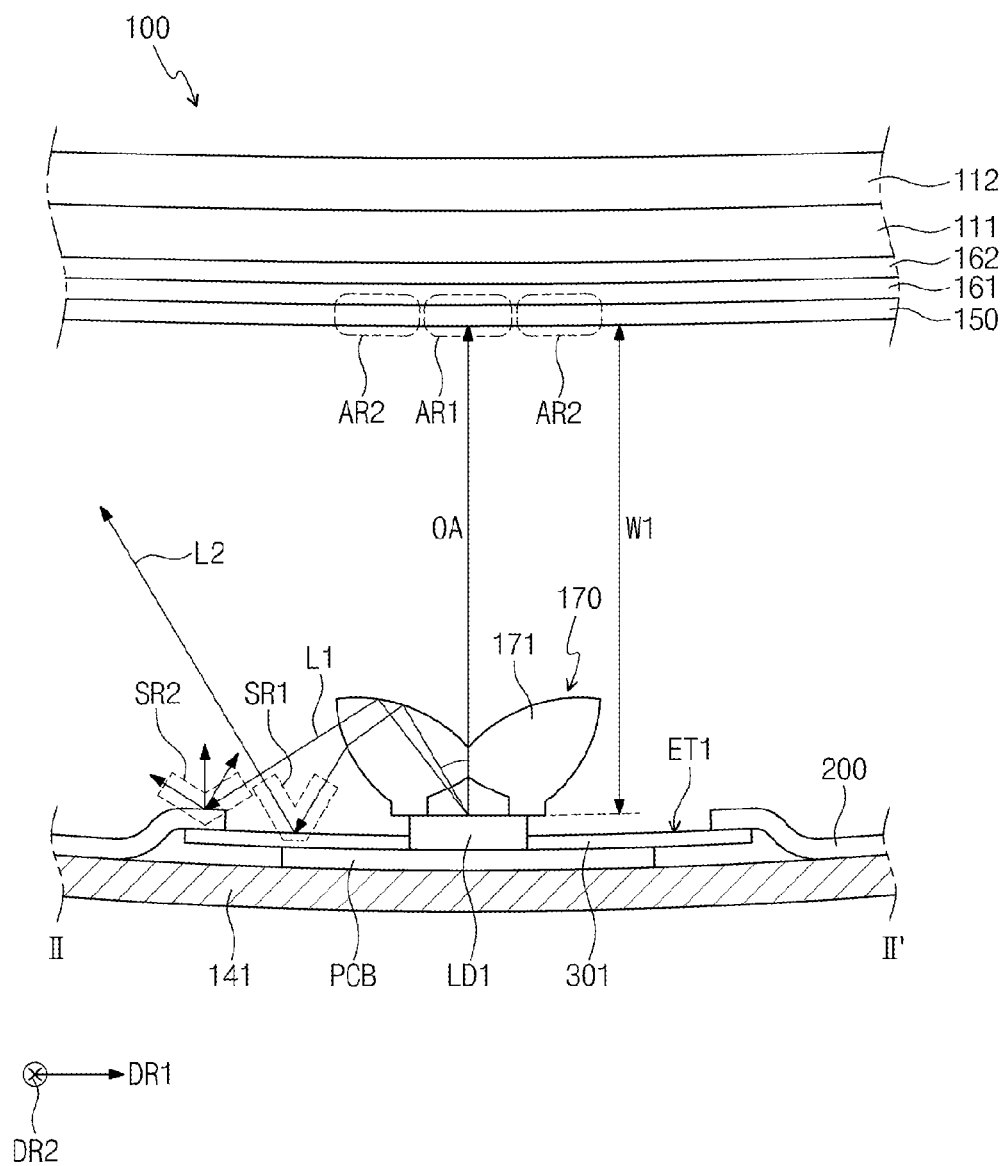
FIG. 5A is a cross-sectional view taken along line II-II' in FIG. 4.

When the percentage of regularly reflected light among light entering the surface of a certain object is defined as a regular reflectance, the regular reflectance of the reflecting members 300 may be defined as a first regular reflectance (SR1 in FIG. 5A) and the regular reflectance of the reflecting sheet 200 may be defined as a second regular reflectance (SR2 in FIG. 5A). In the present embodiment, the first regular reflectance SR1 (in FIG. 5A) may be greater than the second regular reflectance SR2 (in FIG. 5A).

The reflecting members 300 may include a first reflecting member 301 disposed under the first light emitting diode LD1, and a second reflecting member 302 disposed under the second light emitting diode LD2. A first area ET1 (in FIG. 4) that the first reflecting member 301 is exposed may be larger than a second area ET2 (in FIG. 4) that the second reflecting member 302 is exposed. Thus, the percentage that light generated from the first light emitting diode LD1 is regularly reflected may be larger than the percentage that light generated from the second light emitting diode LD2 is regularly reflected.

The backlight unit 120 may further include lens units 170. The lens units 170 may have a one-to-one correspondence with the light emitting diodes LD to cover the light emitting diodes LD. Each of the lens units 170 may include a lens 171 and support units 172. The lens 171 may cover each of the light emitting diodes LD and the support units 172 may combine with the bottom surface of the lens 171 to support the lens 171. Although the lens 171 is shown as a side emitting lens in the present embodiment, the present invention is not limited thereto, and in another embodiment, the lens 171 may also be a top emitting lens.

Figure 4:
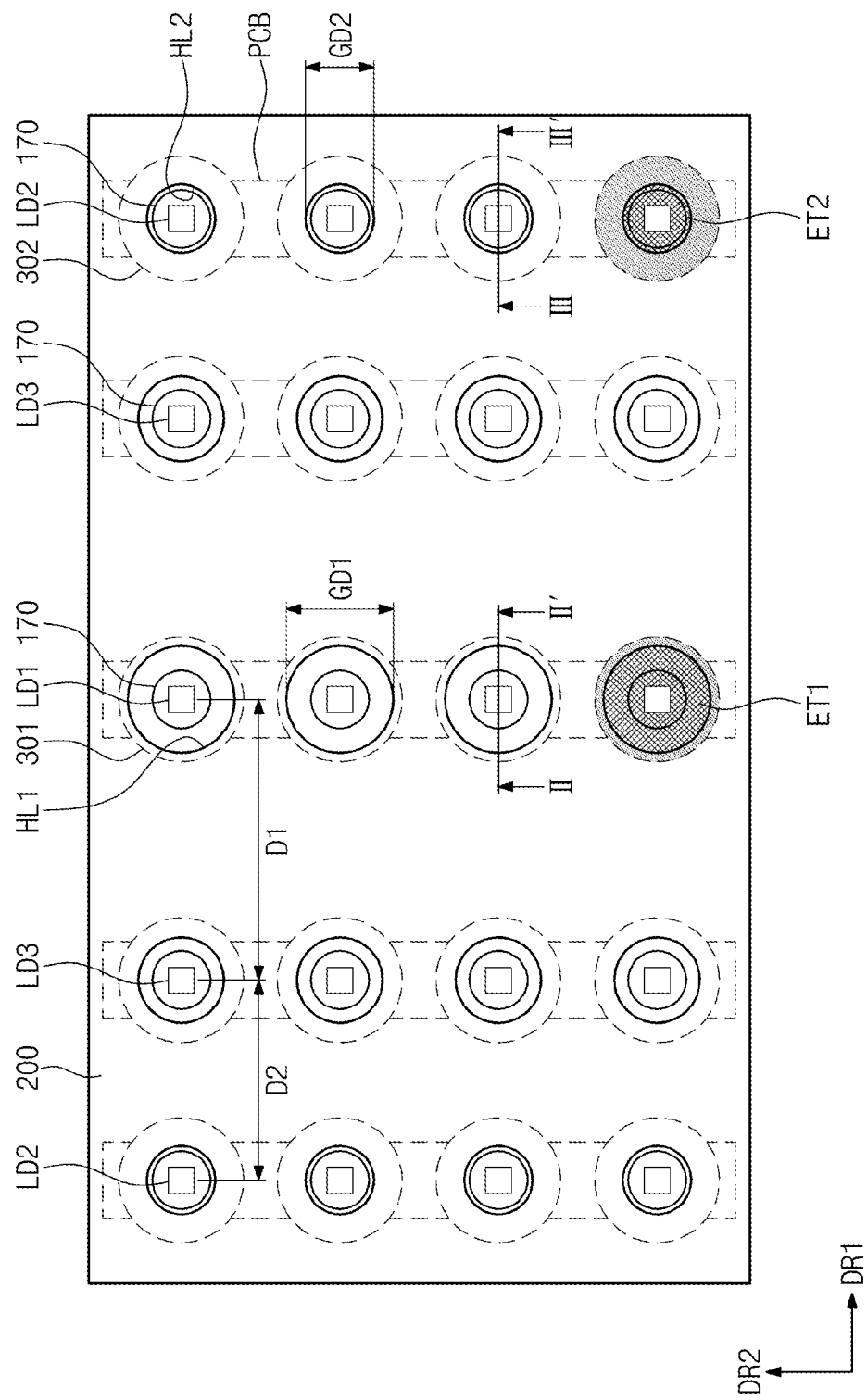
FIG. 4 is a plan view of light emitting diodes (LEDs) disposed on the bottom portion of a bottom chassis in FIG. 1.

FIG. 4 is a plan view of light emitting diodes disposed on the bottom portion of a bottom chassis in FIG. 1.

Referring to FIG. 4, as an optical distance increases, a light diffusion level may increase. Thus, the pitch between the light emitting diodes LD (in FIG. 2) arranged in the first direction DR1 among the light emitting diodes LD (in FIG. 2) may be proportional to the optical distance between the light emitting diodes LD (in FIG. 2) and the diffusion member 150 (in FIG. 3).

As described above with reference to FIG. 3, the first optical distance W1 (in FIG. 3) defined on the first light emitting diode LD1 among the first to third light emitting diodes LD1 to LD3 is largest and the third optical distance W3 (in FIG. 3) defined on the second light emitting diode LD2 is smallest. Thus, a first pitch D1 between the first light emitting diode LD1 and the third light emitting diode LD3 may be larger than a second pitch D2 between the third light emitting diode LD3 and the second light emitting diode LD2. That is, the pitch between the light emitting diodes LD (in FIG. 2) arranged in the first direction may increase at the center of the bottom portion 141. Thus, as the pitch between the light emitting diodes LD (in FIG. 2) arranged in the first direction DR1 increases, it is possible to decrease the number of the light emitting diodes LD (in FIG. 2) arranged in the first direction DR1 and thus it is possible to reduce the manufacturing costs of the backlight unit 120 and the display apparatus 100.

The through hole HL (in FIG. 2) defined in the reflecting sheet 200 may have a first through hole HL1 through which the first light emitting diode LD1 passes and a second through hole HL2 through which the second light emitting diode LD2 passes. In the present embodiment, the size of the first through hole HL1 may be larger than that of the second through hole HL2. For example, a first diameter GD1 of the first through hole HL1 may be larger than a second diameter GD2 of the second through hole HL2.

Thus, an area that the reflecting members 300 (in FIG. 2) disposed under the reflecting sheet 200 are exposed may vary depending on the location of the light emitting diodes LD (in FIG. 2). The first area ET1 that the first reflecting member 301 disposed under the first light emitting diode LD1 is exposed may be larger than the second area ET2 that the second reflecting member 302 disposed under the second light emitting diode LD2 is exposed. In order to clearly show which regions of the first reflecting member 301 and the second reflecting member 302 are exposed and not exposed, some portions of drawings have light and shade. For example, the exposed regions of the first reflecting member 301 and the second reflecting member 302 are indicated by a lattice pattern.

In the present embodiment, since the first regular reflectance SR1 (in FIG. 5A) of the reflecting members 300 (in FIG. 2) is larger than the second regular reflectance SR2 (in FIG. 5A) of the reflecting sheet 200, the amount of regularly reflected light among light generated from the first light emitting diode LD1 may be more than the amount of regularly reflected light among light generated from the second light emitting diode LD2. Related descriptions are provided in more detail in FIGS. 5A and 5B.

Figure 5B:
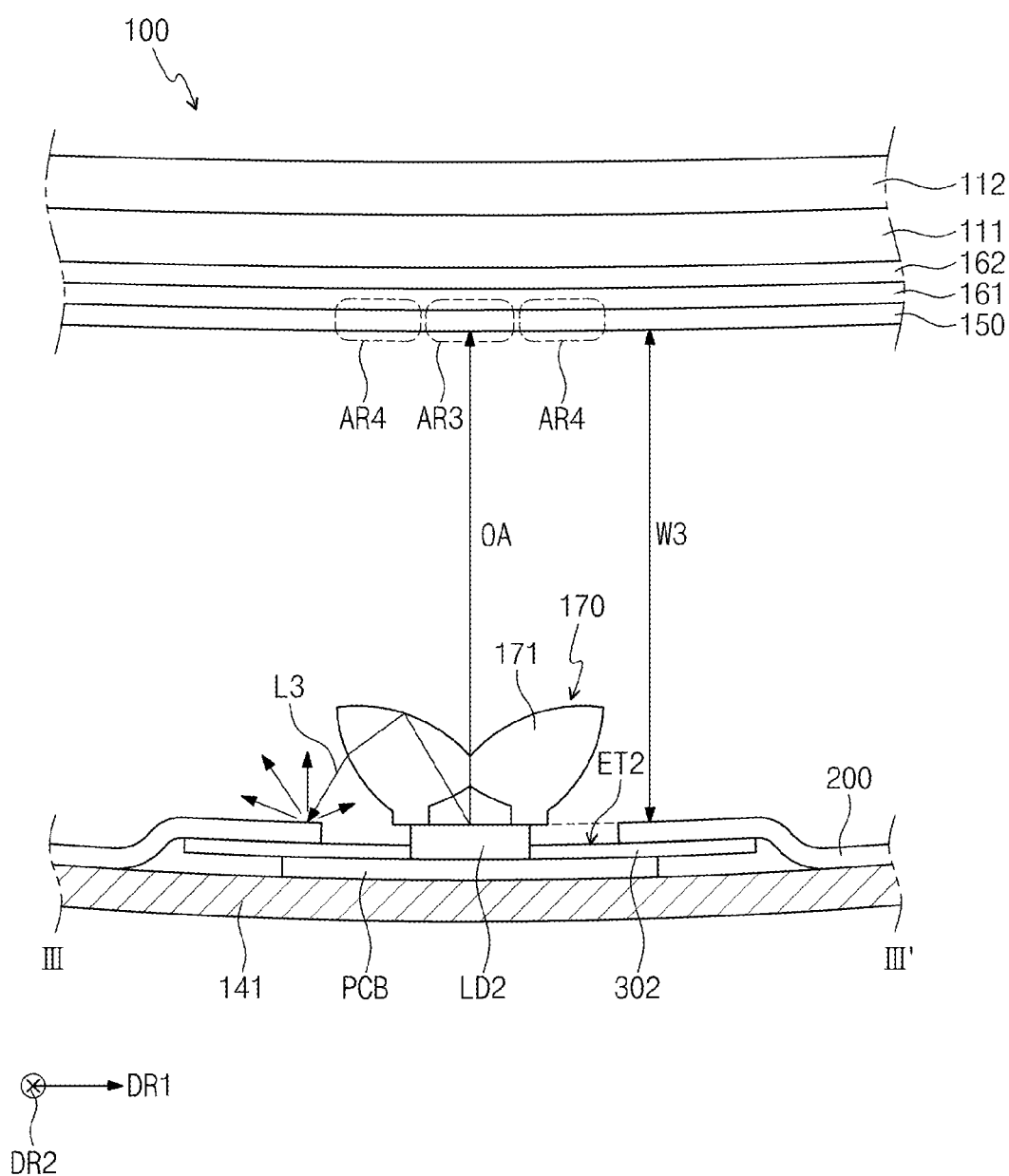
FIG. 5B is a cross-sectional view taken along line III-III' in FIG. 4.

FIG. 5A is a cross-sectional view taken along line II-II' in FIG. 4, and FIG. 5B is a cross-sectional view taken along line III-III' in FIG. 4.

Referring to FIGS. 5A and 5B, the diffusion member 150 may have a first region AR1 corresponding to the location of the first light emitting diode LD1, a second region AR2 adjacent to the first region AR1, a third region AR3 corresponding to the location of the second light emitting diode LD2, and a fourth region AR4 adjacent to the third region AR3.

Light exiting through the top of the lens 171 may be diffused until arriving at the diffusion member 150. As the optical distance increases, light exiting through the top of the lens 171 may be diffused more widely. The first optical distance W1 of the first light emitting diode LD1 is larger than the third optical distance W3 of the second light emitting diode LD2. Thus, light generated from the first light emitting diode LD1 may be diffused more than light generated from the second light emitting diode LD2. As a result, the density difference between light arriving at the first region AR1 and light arriving at the second region AR2 may be smaller than the density difference between light arriving at the third region AR3 and light arriving at the fourth region AR4.

By making the first optical distance W1 of the first light emitting diode LD1 larger than the third optical distance W3, it is possible to minimize the luminescence difference between the first region AR1 and the second region AR2 without increasing the thickness of the display apparatus 100 recognized by a user.

The first pitch D1 between the first light emitting diode LD1 and the third light emitting diode LD3 (in FIG. 3) may be larger than the second pitch D2 between the third light emitting diode LD3 (in FIG. 3) and the second light emitting diode LD2. Thus, an area that light generated from the first light emitting diode LD1 has to cover the diffusion member 150 is larger than an area that light generated from the second light emitting diode LD2 has to cover the diffusion member 150.

In the present embodiment, the reflecting members 300 (in FIG. 2) may include a metal member, such as aluminum, silver and titanium oxide, or mirror-finish plastic, and the reflecting sheet 200 may include a plastic member, such as polyethylene terephthalate, polyethylene, polypropylene, or polycarbonate. Since the metal member and the mirror-finish plastic may generally have a larger regular reflectance than the plastic member, the first regular reflectance SR1 of the reflecting members 300 (in FIG. 2) may be larger than the second regular reflectance SR2 of the reflecting sheet 200.

The first area ET1 that the first reflecting member 301 disposed under the first light emitting diode LD1 is exposed may be larger than the second area ET2 that the second reflecting member 302 disposed under the second light emitting diode LD2 is exposed. As a result, the amount of regularly reflected light among light generated from the first light emitting diode LD1 may be more than the amount of regularly reflected light among light generated from the second light emitting diode LD2.

Light generated from the first light emitting diode LD1 and reflected from the reflecting sheet 200 is defined as first light L1 and light generated from the first light emitting diode LD1 and reflected from the first reflecting member 301 is defined as second light L2.

Light entering a plane of incidence may experience diffuse reflection and regular reflection. The regular reflection is defined as light of which the incidence angle and reflecting angle are the same with respect to the plane of incidence and the diffuse reflection is light that is reflected from the plane of incidence to all directions, but for the convenience of description, the diffuse reflection is defined as light excluding regularly reflected light among reflected light.

In the case of the first light L1, the amount of light diffuse-reflected from the reflecting sheet 200 may be more than the amount of regularly reflected light and in the case of the second light L2, the amount of regularly reflected light may be more than the amount of diffuse-reflected light.

The amount of light travelling in a direction receding from the optical axis OA may increase by the second light L2. As a result, it is possible to enhance the half width of the luminescence of light generated from the first light emitting diode LD1 arriving at the diffusion member 150. The half width of the luminescence may be defined as the width of a region that has luminescence being 50% of the maximum luminescence of light generated from the first light emitting diode LD1, and the optical axis OA may be defined as an axis perpendicular to the light emitting surface of each of the light emitting diodes LD.

Unlike the present embodiment of the present invention, when the first area that the first reflecting member 301 is exposed and is the same as the second area that the second reflecting member 302 is exposed, the third optical distance W3 is smaller than the first optical distance W1 and thus the density difference between light arriving at the third region AR3 and light arriving at the fourth region AR4 may be larger than the density difference between light arriving at the first region AR1 and light arriving at the second region AR2. As a result, there may be a bright spot on the third region AR3 and there may be luminescence speck representing a blind spot on the fourth region AR4. According to the present embodiment, the second area ET2 that the second reflecting member 302 is exposed and is however smaller than the first area ET1 that the first reflecting member 301 is exposed. Thus, a probability that light generated from the second light emitting diode LD2 arrives at the reflecting sheet 200 is higher than a probability that light generated from the first light emitting diode LD1 arrives at the reflecting sheet 200. As a result, light generated from the second light emitting diode LD2 may be diffused by the reflecting sheet 200 and thus it is possible to decrease the density difference between light arriving at the third AR3 and light arriving at the fourth region AR4 and it is possible to minimize luminescence speck.

More particularly, light generated from the second light emitting diode LD2 and reflected from the reflecting sheet 200 is defined as third light L3. Even if the angle between the optical axis OA and the third light L3 is the same as the angle between the optical axis OA and the second light L2, the third light L3 may arrive at the reflecting sheet 200 and be reflected therefrom unlike the second light L2 because the second area ET2 is smaller than the first area ET1. Since the second regular reflectance SR2 of the reflecting sheet 200 is smaller than the first regular reflectance SR1, the amount of regularly reflected light among third light L3 arriving the reflecting sheet 200 may be less than the amount of diffuse-reflected light. The third light L3 may be mostly diffuse-reflected. The third light L3 is reflected from the reflecting sheet 200 and may be diffuse-reflected to all directions without leaning to any one direction. Thus, the third light L3 is also reflected toward the optical axis OA and thus the density difference between light arriving at the third region AR3 and light arriving at the fourth region AR4 may be minimized. Thus, it is possible to minimize luminescence speck on the third region AR3 and the fourth region AR4, the backlight unit 120 (in FIG. 1) may provide the display panel 110 (in FIG. 1) with light having uniform luminescence, and the display quality of the display apparatus 100 (in FIG. 1) may be enhanced.

Figure 6:
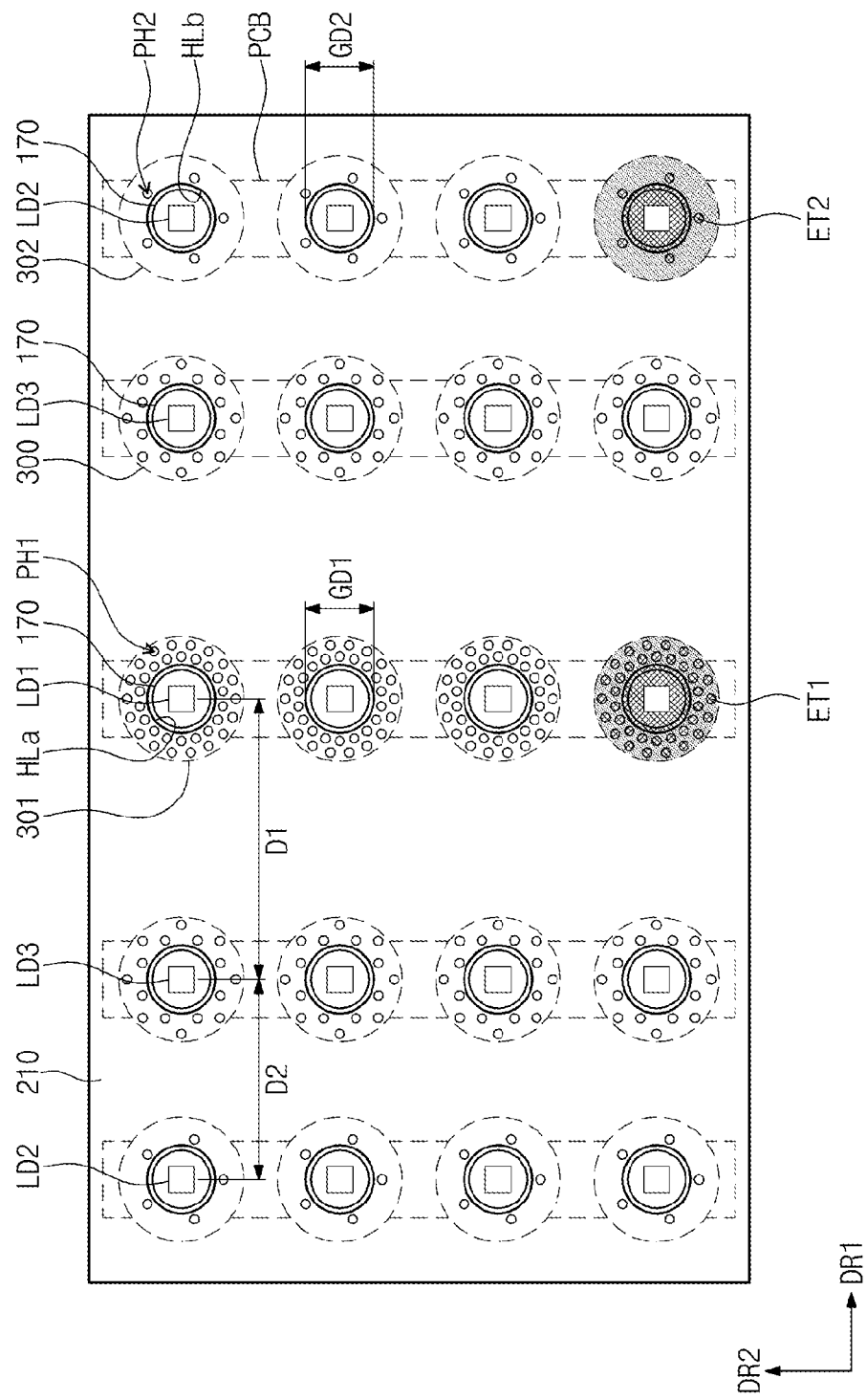
FIG. 6 is a plan view of LEDs disposed on the bottom portion of a bottom chassis according to another embodiment of the present invention.

FIG. 6 is a plan view of light emitting diodes disposed on the bottom portion of a bottom chassis according to another embodiment of the present invention.

Referring to FIG. 6, through holes are defined in the reflecting sheet 210. The through holes may have a first through hole HLa through which the first light emitting diode LD1 passes and a second through hole HLb through which the second light emitting diode LD2 passes. In the present embodiment, the sizes of the first through hole HLa and the second through hole HLb may be the same. For example, the first diameter GD1 of the first through hole HLa and the second diameter GD2 of the second through hole HLb may be mutually the same.

Pattern holes may be defined around the through holes. The pattern holes may have first pattern holes PH1 and second pattern holes PH2. The first pattern holes PH1 may be defined around the first through hole HL1 and the second pattern holes PH2 may be defined around the second through hole HL2. In the present embodiment, the density of the first pattern holes PH1 may be higher than that of the second pattern holes PH2. Thus, the first area ET1 that the first reflecting member 301 is exposed may be larger than the second area ET2 that the second reflecting member 302 is exposed.

Since the first area ET1 is wider than the second area ET2, the amount of light arriving at the first reflecting member 301 among light generated from the first light emitting diode LD1 may be more than the amount of light arriving at the second reflecting member 302 among light generated from the second light emitting diode LD2. Thus, since the first regular reflectance SR1 (in FIG. 5A) is higher than the second regular reflectance SR2 (in FIG. 5A), the amount of regularly reflected light among light generated from the first light emitting diode LD1 is more than the amount of regularly reflected light among light generated from the second light emitting diode LD2. As a result, since there is a lot of light regularly reflected from the first light emitting diode LD1, the half width of luminescence of light generated from the first light emitting diode LD1 arriving at the diffusion member 150 (in FIG. 2) may be enhanced.

Also, the amount of light arriving at the reflecting sheet 210 among light generated from the second light emitting diode LD2 may be more than the amount of light arriving at the reflecting sheet 210 among light generated from the first light emitting diode LD1. Thus, since the second regular reflectance SR2 (in FIG. 5A) is smaller than the first regular reflectance SR1 (in FIG. 5A), the amount of diffuse-reflected light may be more than that of regularly reflected light in the case of light generated from the second light emitting diode LD2. That is, the light generated from the second light emitting diode LD2 is diffuse-reflected and thus it is possible to minimize luminescence speck due to the luminescence difference between the third region AR3 (in FIG. 5B) and the fourth region AR4 (in FIG. 5B).

Figure 7:
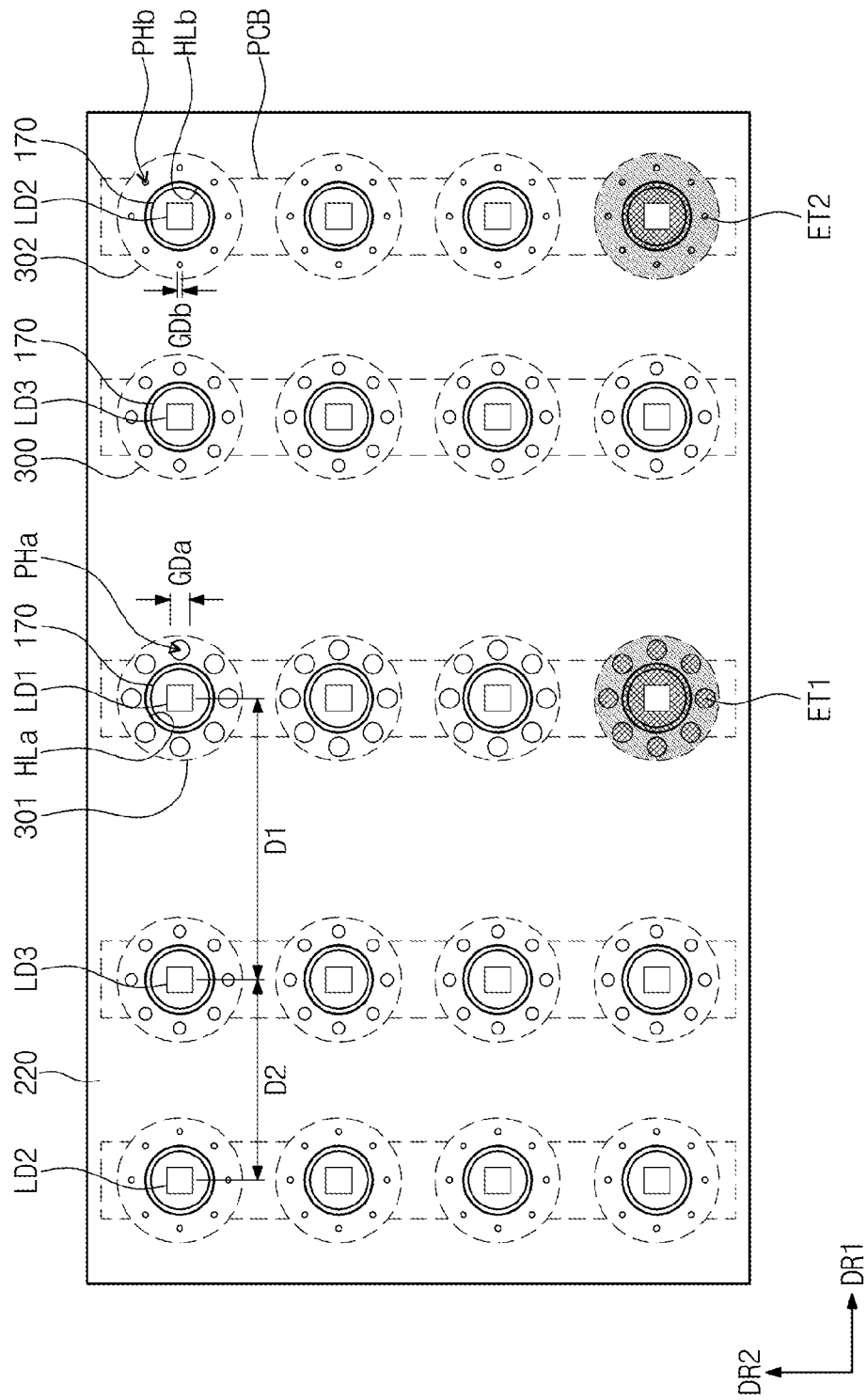
FIG. 7 is a plan view of LEDs disposed on the bottom portion of a bottom chassis according to another embodiment of the present invention.

FIG. 7 is a plan view of light emitting diodes disposed on the bottom portion of a bottom chassis according to another embodiment of the present invention. In describing FIG. 7, reference numerals of FIG. 6 as described above are used and related descriptions are not provided.

First pattern holes PHa may be defined around first through hole HLa and second pattern holes PHb may be defined around second through hole HLb. In the present embodiment, the density of the first patterns holes PHa may be the same as the density of the second pattern holes PHb but the size of the first pattern holes PHa may be different from the size of the second pattern holes PHb. For example, a first diameter of each of the first pattern holes PHa may be larger than a second diameter GDb of each of the second pattern holes PHb.

Thus, the first area ET1 that the first reflecting member 301 having a higher regular reflectance than the reflecting sheet 220 is exposed may be larger than the second area ET2 that the second reflecting member 302 is exposed. Thus, the amount of light that is regularly reflected after exiting from the first light emitting diode LD1 and is diffused further from the optical axis OA (in FIG. 5A) may be more than the amount of light that is regularly reflected and diffused after exiting from the second light emitting diode LD2, and as a result, the half width of luminescence of light generated from the first light emitting diode LD1 arriving at the diffuse member 150 (in FIG. 2) may be enhanced. Also, the light exiting from the second light emitting diode LD2 is diffuse-reflected and thus it is possible to minimize luminescence speck due to the luminescence difference between the third region AR3 (in FIG. 5B) and the fourth region AR4 (in FIG. 5B).

FIG. 6 has described as an example that the first pattern holes PH1 (in FIG. 6) and the second pattern holes PH2 (in FIG. 6) are the same in size and different in density, and FIG. 7 has described as an example that the first pattern holes PHa and the second pattern holes PHb are the same in density and different in size, but the present invention is not limited thereto. For example, the first pattern holes and the second pattern holes may be different in both size and density in another embodiment of the present invention.

The radius of curvature of the bottom portion of the backlight unit curved along the first direction of the present invention is different from the radius of curvature of the diffusion member. Thus, when light emitting diodes are disposed on the bottom portion, the optical distance between the light emitting diodes and the diffusion member varies depending on the location of the light emitting diodes. The pitch between the light emitting diodes arranged in the first direction may be proportional to the optical distance. Thus, it is possible to decrease the number of light emitting diodes in comparison to when optical distances all are the same, and as a result, it is possible to reduce the manufacturing costs of the backlight unit and the display apparatus.

Also, according to the present invention, it is possible to regulate a level of regular reflection by changing, the exposed area of the reflecting members having a different regular reflection from the reflecting sheet, depending on the location of the light emitting diodes. Thus, it is possible to enhance the half width of luminescence of light provided by the backlight unit or minimize luminescence speck. As a result, the backlight unit may provide the display panel with light having uniform luminescence and the display quality of the display apparatus may be enhanced.

While exemplary embodiments of the present invention are described above, a person skilled in the art may understand that many modifications and variations may be made without departing from the spirit and scope of the present invention defined in the following claims. Thus, the technical scope of the present invention is not limited to matters described in the detailed description but should be defined by the following claims.

What is claimed is:

1. A display apparatus comprising:
a display panel curved along a first direction; and
a backlight unit providing a light to the display, wherein the backlight unit comprises:

a bottom chassis comprising a bottom portion curved along the first direction;

a plurality of light emitting diodes disposed on the bottom portion;

reflecting members disposed on the bottom portion, the reflecting members being disposed in peripheral regions of the light emitting diodes and having a one-to-one correspondence; and a reflecting sheet covering the bottom portion and the reflecting members, reflecting light generated from the light emitting diodes, and exposing a portion of each of the reflecting members, wherein the light emitting diodes comprises a first light emitting diode and a second light emitting diode spaced apart from the first light emitting diode in the first direction, wherein:

the reflecting members comprise a first reflecting member disposed in a first peripheral region of the first light emitting diode and a second reflecting member disposed in a second peripheral region of the second light emitting diode;

an area of a portion of the first reflecting member exposed by the reflecting sheet is defined as a first area and an area of a portion of the second reflecting member exposed by the reflecting sheet is defined as a second area; and the first area and the second area are different.

2. The display apparatus of claim 1, wherein a first regular reflectance of the reflecting members is larger than a second regular reflectance of the reflecting sheet.

3. The display apparatus of claim 2, wherein the backlight unit further comprises a diffusion member disposed on the light emitting diodes and curved along the first direction, and a first optical distance between the first light emitting diode and the diffusion member is larger than a second optical distance between the second light emitting diode and the diffusion member, and the first area is larger than the second area.

4. The display apparatus of claim 3, wherein a radius of curvature of the bottom portion is smaller than a radius of curvature of the diffusion member.

5. The display apparatus of claim 3, wherein through holes which has a one-to-one correspondence with the light emitting diodes and through which the light emitting diodes pass are defined in the reflecting sheet, and the through holes have a first through hole through which the first light emitting diode passes and a second through hole through which the second light emitting diode passes.

6. The display apparatus of claim 5, wherein a size of the first through hole is larger than a size of the second through hole, and the first area of the first reflecting member exposed by the first through hole is larger than the second area of the second reflecting member exposed by the second through hole.

7. The display apparatus of claim 5, wherein pattern holes are defined around the through holes of the reflecting sheet, and a portion of each of the reflecting members disposed under the reflecting sheet is exposed by the pattern holes, and the pattern holes have first pattern holes defined around the first through hole and second pattern holes defined around the second through hole.

8. The display apparatus of claim 7, wherein a size of the first through hole is substantially same as a size of the second through hole.

9. The display apparatus of claim 7, wherein a density of the first pattern holes is larger than a density of the second pattern holes.

10. The display apparatus of claim 7, wherein a size of each of the first pattern holes is larger than a size of each of the second pattern holes.

11. The display apparatus of claim 1, wherein the backlight unit further comprises a plurality of lens units that has a one-to-one correspondence with the light emitting diodes and covers the light emitting diodes.

12. The display apparatus of claim 11, wherein each of the lens units comprises a side emitting lens.

13. A backlight unit comprising:

a bottom chassis comprising a bottom portion curved along a first direction;

a plurality of light emitting diodes disposed on the bottom portion;

reflecting members disposed on the bottom portion, the reflecting members being disposed in peripheral regions of the light emitting diodes and having a one-to-one correspondence; and a reflecting sheet covering the bottom portion and the reflecting members, reflecting light generated from the light emitting diodes, and exposing a portion of each of the reflecting members, wherein the light emitting diodes comprises a first light emitting diode and a second light emitting diode spaced apart from the first light emitting diode in the first direction, wherein:

the reflecting members comprise a first reflecting member disposed in a first peripheral region of the first light emitting diode and a second reflecting member disposed in a second peripheral region of the second light emitting diode;

an area of a portion of the first reflecting member exposed by the reflecting sheet is defined as a first area and an area of a portion of the second reflecting member exposed by the reflecting sheet is defined as a second area; and the first area and the second area are different.

14. The backlight unit of claim 13, wherein a first regular reflectance of the reflecting members is larger than a second regular reflectance of the reflecting sheet.

15. The backlight unit of claim 14, further comprises a diffusion member disposed on the light emitting diodes and curved along the first direction, and a first optical distance between the first light emitting diode and the diffusion member is larger than a second optical distance between the second light emitting diode and the diffusion member, and the first area is larger than the second area.

* * * * *